United States Patent [19]
Nakasaki

[11] Patent Number: 5,111,863
[45] Date of Patent: May 12, 1992

[54] PNEUMATIC TIRE INCLUDING DIVIDED BELT PLIES

[75] Inventor: Eiji Nakasaki, Kakogawa, Japan

[73] Assignee: Sumitomo Rubber Industries, Ltd., Hyogo, Japan

[21] Appl. No.: 564,403

[22] Filed: Aug. 8, 1990

[30] Foreign Application Priority Data

Aug. 10, 1989 [JP] Japan .................. 1-209295
Aug. 15, 1989 [JP] Japan .................. 1-211161

[51] Int. Cl.$^5$ .......................... B60C 9/00; B60C 9/18
[52] U.S. Cl. ........................ 152/526; 152/533; 152/536
[58] Field of Search ............... 152/526, 528, 529, 530, 152/531, 532, 533, 534, 535–538, 197, 450, DIG. 19, 536; 156/117, 130

[56] References Cited

U.S. PATENT DOCUMENTS

| | | | |
|---|---|---|---|
| 3,083,749 | 4/1963 | Destinay et al. | 152/535 |
| 3,342,239 | 9/1967 | Olagnier | 152/535 |
| 3,467,161 | 9/1969 | Menell et al. | 152/526 |
| 3,712,362 | 1/1973 | Alderfer | 152/531 |
| 3,850,219 | 11/1974 | Snyder | 152/531 |
| 4,077,454 | 3/1978 | Miyoshi et al. | 152/538 |
| 4,184,530 | 1/1980 | Mirtain | 152/536 |
| 4,258,774 | 3/1981 | Mirtain et al. | 152/536 X |
| 4,696,335 | 9/1988 | Tsukagoshi et al. | 152/526 X |

FOREIGN PATENT DOCUMENTS

56-71604 6/1981 Japan .................. 152/533

Primary Examiner—Michael W. Ball
Assistant Examiner—Adrienne C. Johnstone
Attorney, Agent, or Firm—Birch, Stewart, Kolasch & Birch

[57] ABSTRACT

Pneumatic tire is provided with a belt layer including a first belt ply of which width is more than 0.9 times and less than 0.95 times the tread width and a second belt ply of which width is more than 0.88 times and less than 0.92 times the tread width, that are arranged in sequence from a carcass side.

One of the belt plies is composed of two belt ply parts which are separated by a gap on the tire's equator. The other belt ply is composed of a middle belt ply part and two side-belt ply parts which are separated by a gap at two division points each spaced apart from the equator in the axial direction by a distance of 0.2 to 0.3 times the other belt ply width.

Initial elasticity EA of the middle belt ply part is preferably larger than the initial elasticity EB of the other belt ply parts, especially, the ratio EA/EB is more preferably 2.0 or more and 4.0 or less.

The gaps are preferably 0.5 mm to 4.0 mm.

16 Claims, 7 Drawing Sheets

PNEUMATIC TIRE INCLUDING DIVIDED BELT PLIES

FIELD OF THE INVENTION

This invention relates to a pneumatic tire which balances rigidities at a crown part and shoulder part of the tread part, reduces vibration in driving and improves riding comfort and steering stability as well as durability.

BACKGROUND OF THE INVENTION

Improvements of the rigidity of tread part in a pneumatic tire have been attempted by forming a belt layer comprising belt plies outside the carcass in the tread part. The rigidity reduces toward the shoulder part from the center in the tire's equator. In other words, as the tread width becomes wider and the aspect ratio becomes lower, the tread radius tends to be flatter, and the cornering force of the tire is increased.

It is known that the rigidity of the belt layer is remarkably increased because of a hoop effect by overlaying plural belt plies with cords placed in different directions.

On the other hand, the shape of tread part is significantly changed at the shoulder part in driving. Therefore, both ends of the belt plies are extended near to the shoulder part to control such change in shape and avoid separation and deviational wear of the belt ply ends.

The rigidity of tread part can be improved by the structure.

However, since the cords of belt plies are crossed, the hoop effect between the belt plies is strengthened. Moreover, as plural belt plies are united, they are stiffened. Therefore, when the aspect ratio is reduced, the tread surface "a" tends to have a reverse warp "r" as shown in FIG. 7, and, as a result, the high-speed durability is reduced, vibrations increase and the riding comfort is reduced.

In addition, as for the distribution of ground-contact pressure, shoulder parts come to have a higher pressure than the central part. As a result, a deviational wear occurs between the shoulder parts and central parts, which becomes a problem by reducing the durability.

A tire having an aspect ratio of 70% or less, specifically, is superior in ground contact performance, while the aforementioned tendency is observed significantly. In the case of forming belt plies by using steel cords, since the rigidity of belt plies themselves is high, the reverse warp in the tread surface becomes pronounced.

SUMMARY OF THE INVENTION

It is a primary object of the invention to present a pneumatic tire that can improve riding comfort, wear resistance and high-speed durability, basically by means of belt plies divided into two parts and three parts, and by forming a belt layer by placing the division points in different positions.

The first invention presents a pneumatic tire comprising a carcass extending from a tread part through a side-wall part and wrapped around a bead core in each of two bead parts, and a belt layer placed radially outside the carcass in the tread part, wherein;

the belt layer includes a first belt ply B1 and a second belt ply B2 that are formed in sequence from the carcass side; the width BW1 of the first belt ply in the direction of tire's axis is in the range from greater than 0.9 to less than 0.95 times of the tread width TW that is the length between outer edges of the tread in the direction of the tire's axis, the width BW2 of the second belt ply B2 in the direction of the tire's axis is in the range from greater than 0.88 to less than 0.92 times the tread width TW; one of the belt plies, the first belt ply B1 or second belt ply B2, is divided into and composed of two belt ply parts BA1 and BA2 which are separated by a gap g1 on the tire's equator C; and the other belt ply is divided into and composed of a middle belt ply part BM and two side-belt ply parts BS1 and BS2 BA are separated by gaps g2a and g2b, respectively, from part BM, each of which is in the range from 0.5 mm to 4 mm. Gaps g2a and g2b are respectively located at two division points Q1 and Q2 located a distance of 0.2 to 0.3 times of width of the one of belt plies BS1 or BS2 from the tire's equator C on both sides in the direction of the tire's axis.

In addition, the initial elasticity EA of belt cords of the middle belt ply part BM is larger than the initial elastic modulus EB of belt cords of the other belt ply parts BA1, BA2, BS1, and BS2 and the ratio EA/EB of initial elasticity EA of the middle belt ply part BM to the initial elasticity EB of belt cords of the other belt ply parts BA1, BA2, BS1 and BS2 is preferably in the range from 2.0 to 4.0. It is also preferred that gaps g1 and g2a, g2b are 0.5 mm or more and 4 mm or less.

In the second invention, a band layer having band cords of organic fibers is provided outside of said belt layer.

It is preferred that the band layer comprises one or more layers of spiral band ply formed by winding band cords spirally or two or more cut end plies of band cords inclined at an angle in the range from 30 deg. to 60 deg. against the tire's equator C with both ends cut off.

Since the maximum and minimum widths of the first and second belt plies B1 and B2 are, respectively, limited with respect to the tread width, they can be formed without too little or too much rigidity about the outer edge of tread part, and the steering stability and riding comfort can be guaranteed.

On the other hand, by dividing one of the belt plies into three parts and the other into two parts and separating the parts by gaps g2a, g2b and g1 respectively, as the lateral force generated in the belt cords is prevented from being conducted to each entire belt ply in cornering or passing over a convex material on the road, the handling performance can be guaranteed. In addition, since the separation in the end part of belt plies that has tended to be caused by such lateral force can be prevented, the durability is improved.

Moreover, as the gap g1 of one of the belt plies and the gaps g2a, g2b of the other belt ply are placed in different positions, the rigidity of the tread part in the radial direction can be maintained as well.

It is preferred that the initial elasticity EA of the belt cords of middle belt ply part BM be larger than the initial elasticity EB of the other belt ply parts BA1, BA2, BS1 and BS2. By this arrangement, the rigidity of the tread part in the radial direction of the central part extending over the tire's equator C is increased, and as the ground-contact pressures in the central part and shoulder parts become more equivalent even in the case of depressed tire with an aspect ratio of 70% or less, the steering stability becomes superior and the durability can be improved without causing a deviational wear. In the case that a band layer is formed outside the belt layer divided in such manner, as the heterogeneous rigidity of the belt layer of the radial direction can be supplemented by the band layer, the belt ply parts BA1, BA2 BM, BS1 and BS2 may be formed to have the same initial elasticity. More preferably, the initial elasticity EA shall be larger than EB even in the case of using a band layer. The band layer can help to improve the straightforward performance as well, as the ply steer caused by the inclination of cords of the second belt ply is removed.

Thus, the aforementioned structures are combined and united to mutually supplement disadvantages and improve overall steering stability and high-speed durability.

DESCRIPTION OF THE DRAWINGS

An embodiment of the present invention will now be described by way of example, referring the attached drawings, in which.

DESCRIPTION OF THE PREFERRED EMBODIMENTS

Figure 1:
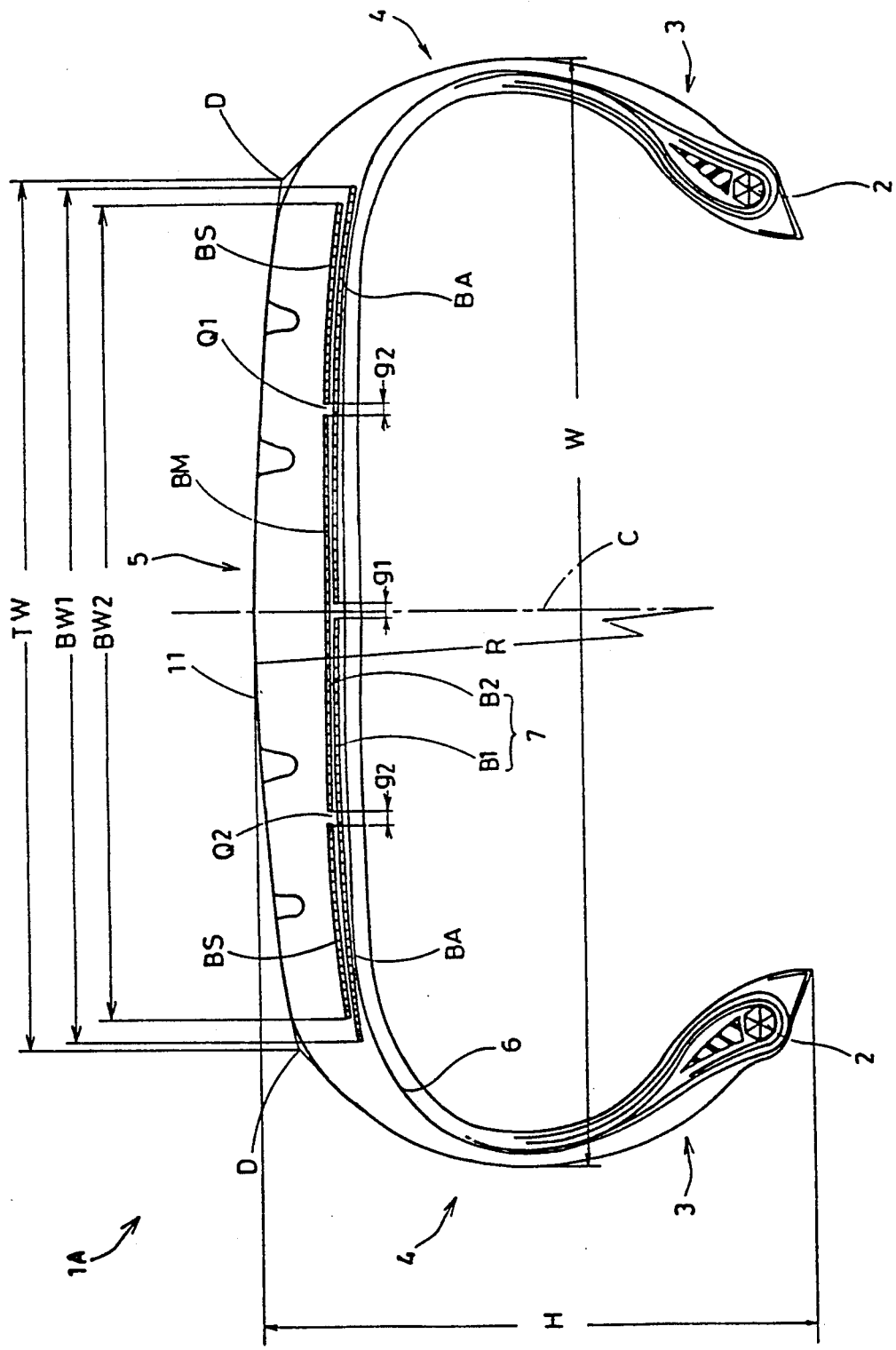
FIG. 1 is a sectional view showing one of the embodiments of tire of the first invention.
Figure 2:
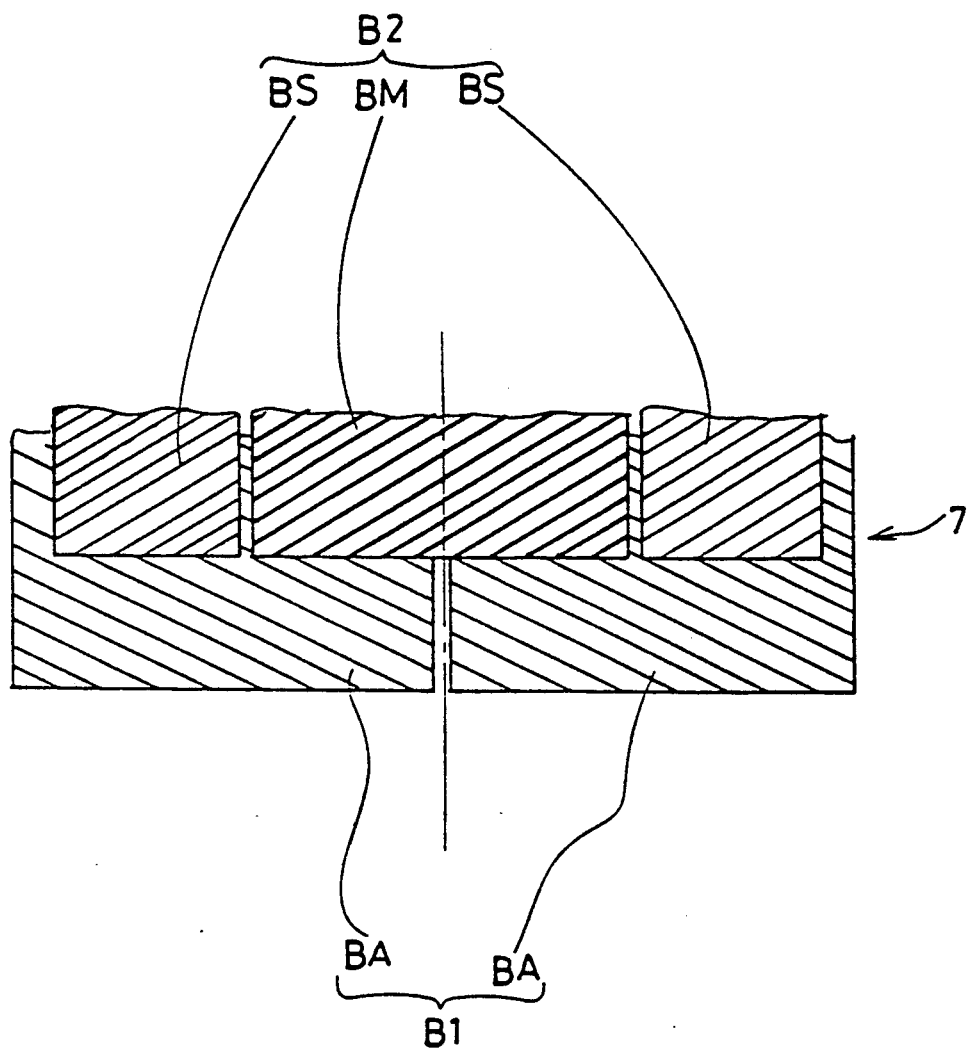
FIG. 2 is a plan development view showing the structure of its belt ply.

As shown in FIGS. 1 and 2, a tire 1A comprises bead parts 3 and 3 on both sides in which a bead core 2 is placed, side-wall parts 4 and 4 extending from the bead part 3 outward in the radial direction of tire and a tread part 5 that connects the upper ends. A carcass 6 extending from the tread part 5 through the side-wall part 4 to the bead part 3 and folded over about the bead core 2 and a belt layer 7 placed in the tread part 5 outside the carcass 6 in the radial direction of tire are placed in the tire 1A.

The carcass 6 is a semi-radial or radial alignment body of carcass cords aligned at an inclination of 45 to 90 deg. against the tire's equator C. Fiber cords such as nylon, polyester and rayon as well as steel cords are used as carcass cords.

The belt layer 7 of the embodiment is composed of two layers comprising a first belt ply B1 and a second belt ply B2 that are placed in sequence from the carcass 6 outward in the radial direction, or, in other words, toward the outer surface 11 of the tread part 5.

The first and second belt plies B1 and B2 include belt cords aligned at an inclination.

As shown in FIG. 2, the cords of first belt ply B1 of the embodiment are aligned at an inclination of 15 to 70 deg. against the tire's equator C upward to the left side. The second belt ply B2 is placed at an inclination of 15 to 70 deg. reversely to the first belt ply B1 upward to the right side. Thus, the cords of first and second belt plies B1 and B2 are mutually crossed, to produce a higher hoop effect. As a result, the rigidity of the tread part 5 in the circumferential and axial directions is improved.

The width BW1 of the first belt ply B1 in the direction of the tire's axis is in the range from greater than 0.9 to less than 0.95 the tread width TW which is a length between the outer edges D and D of the tread part in the direction of the tire's axis. Moreover, the width BW2 of the second belt ply B2 in the direction of the tire's axis is in the range from greater than 0.88 to less than 0.92 times tread width TW.

In the case that the widths of the first and second belt plies B1 and B2 are less than the respective minimum limit, the rigidity is too low near the outer edges D and D of the tread part, that is, in the shoulder part. Thereby, the tendency of reverse warp in the middle of the tread part becomes increased to form a convex in the middle part. In the case that the widths of the first and second belt plies B1 and B2 are more than the maximum limit, the rigidity of the tread part becomes excessive, thereby causing inferior steering stability.

The width of second belt ply B2 is formed to be less than that of the first belt ply B1. Thus, an excessive sideward extension of the end part of second belt ply B2 can be prevented, and separations that tend to be caused in the end of belt plies can be prevented.

The first belt ply B1 comprises two belt ply parts BA1 and BA2 which are divided and separated by a gap g1 of 0.5 mm or more and 4 mm or less on the tire's equator line C. The second belt ply B2 comprises a middle belt ply part BM and two side belt ply parts BS1 and BS2 by dividing the ply into three parts and separating them by gaps g2a, g2b, each of which is in the range from 0.5 mm to 4 mm at two division points Q1 and Q2, located 0.2 to 0.3 times the width BW1 of the first belt ply B1 from the tire's equator C on both sides in the direction of the tire's axis.

Thus, the first and second belt plies B1 and B2 are divided into different number of parts at different points in diamond-checkered shape. As a result, the belt layer 7 can be formed without matching the gaps g1 and g2a, g2b and the elastic property of the tread part 5 can be improved while maintaining the rigidity of belt layer 7 in the axial direction and the rigidity in the radial direction of tire.

When the gaps g1 and g2a, g2b are less than 0.5 mm, the handling performance deteriorates. In cornering or passing over a convex material, a lateral force acts to the belt plies B1 and B2. However, the rubber between the gaps g1 and g2 can not absorb a deviation of belt parts caused by the lateral force, and such deterioration caused by the lateral force is conducted to each entire belt ply. When the gaps g1 and g2a, g2b exceeds 4 mm, the rigidity of belt layer 7 in the radial direction of tire deteriorates at the gap parts, which tends to cause a reverse warp in the tread surface. As a result, the ground-contact pressure comes to be heterogeneous in the middle part and shoulder part, which deteriorates the handling performance and durability by deviational wear.

For belt cords of the first and second belt plies B1 and B2, fiber cords having a relatively high elasticity such as nylon, polyester and rayon as well as Teflon, aromatic polyamide fibers and steel cords are used.

The initial elasticity EA of cords of the middle belt ply part BM of the second belt ply B2 is more than the initial elasticity EB of cords of the side belt ply parts BS1, BS2 and the belt ply parts BA1 and BA2 of the first belt ply B1.

The ratio EA/EB is from 2.0 to 4.0. When the ratio EA/EB is less than 2.0, the rigidity in the middle of the tread part 5 in the radial direction of tire deteriorates. As a result, the ground contact pressure in the central part and shoulder part comes to be nonequivalent, deviational wear tends occur, and the durability becomes inferior. On the contrary, when the ratio EA/EB exceeds 4.0, the rigidity in the central part becomes excessive, and the riding comfort deteriorates.

The curvature radius R on the outer surface 11 of the tread part 5 forms a convex arc in a range from 300 mm to 360 mm in the embodiment, when the tire is mounted on a specified rim, and a specified internal pressure is applied.

Figure 3:
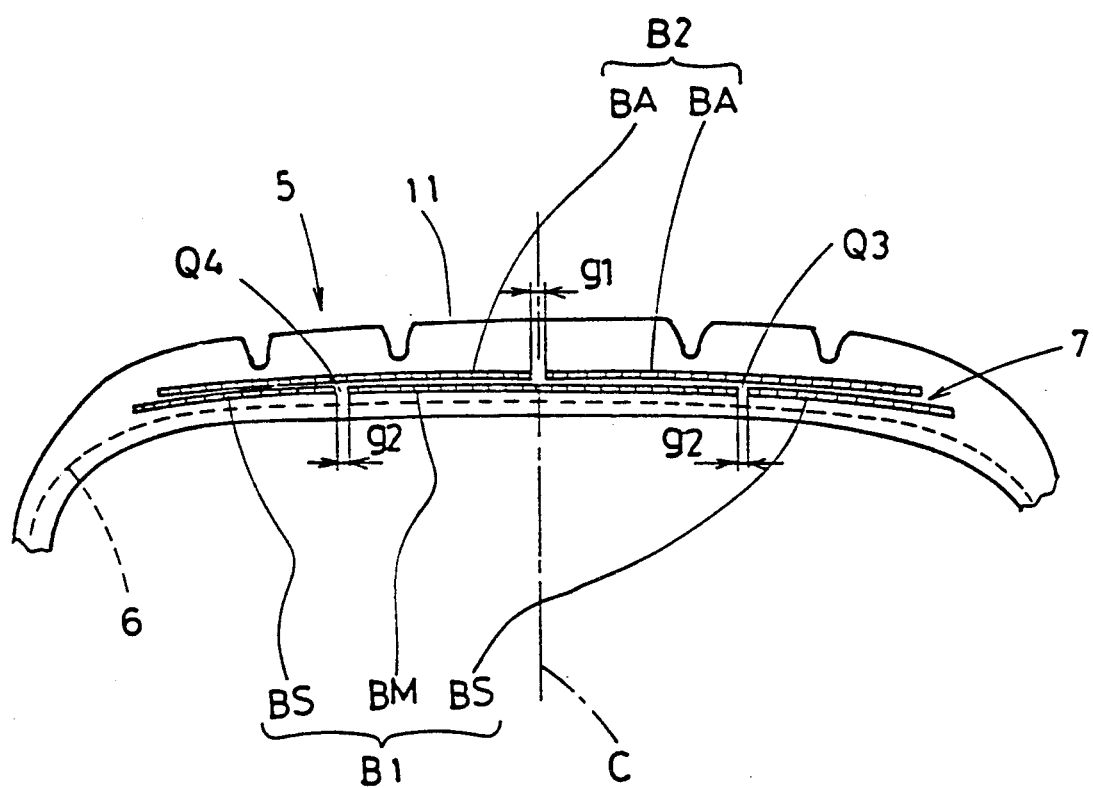
FIG. 3 is a sectional view showing another embodiment of the first invention.

Another embodiment of the first invention is shown in FIG. 3.

The second belt ply B2 of the belt layer 7 in the embodiment comprises two belt ply parts BA1 and BA2 divided on the tire's equator C reversely to the structure shown in FIG. 1, while the first belt ply B1 is composed of a middle belt ply BM and two side belt plies BS1 and BS2 by dividing it into three parts and separating them by a gap $g2a$, $g2b$ at two division points Q3 and Q4 which points are 0.2 to 0.3 times of the width BW2 of the second belt ply B2 from the tire's equator C on both sides in the direction of the tire's axis.

Figure 4:
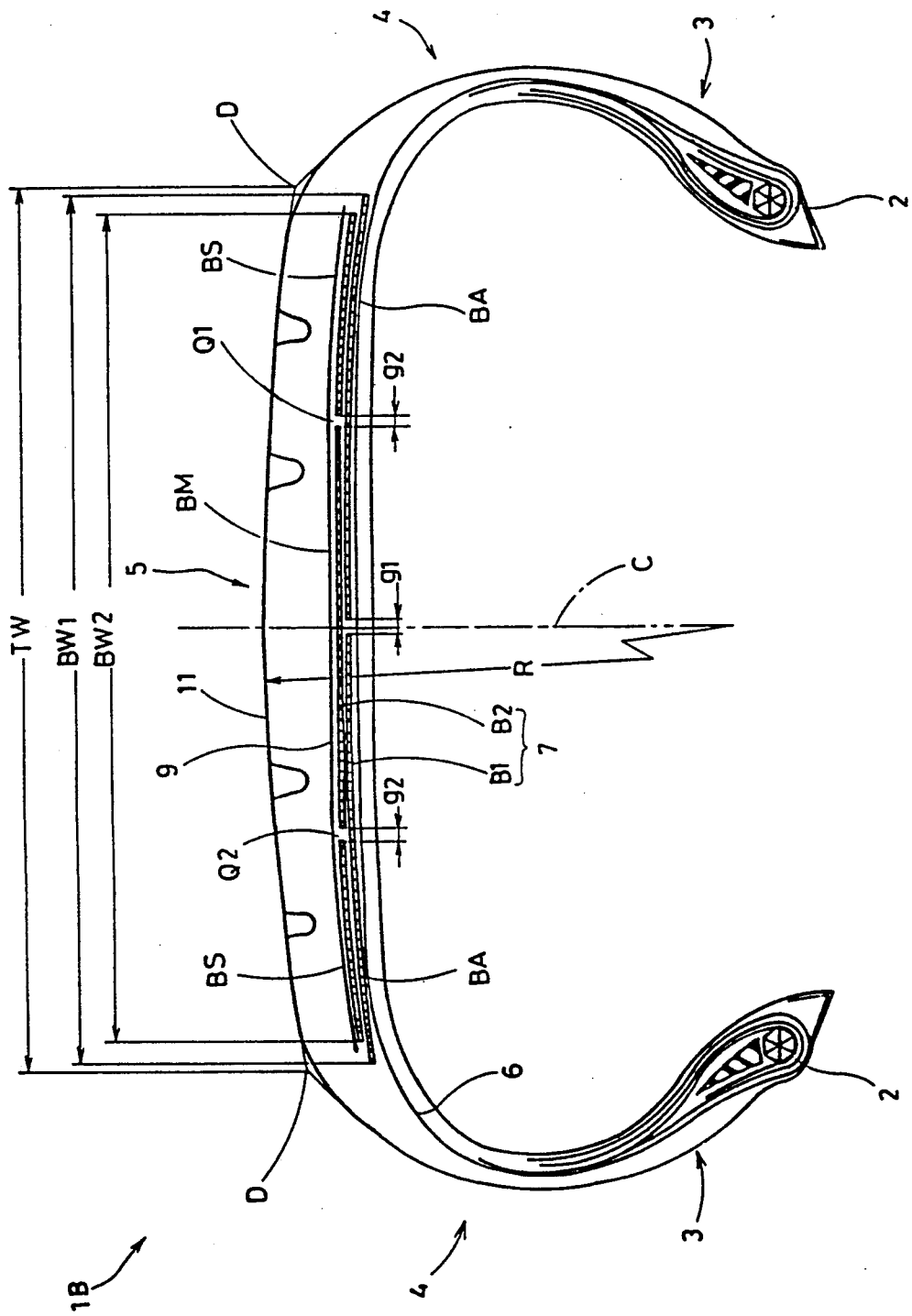
FIG. 4 is a sectional view showing one of the embodiments of tire of the second invention.
Figure 5:
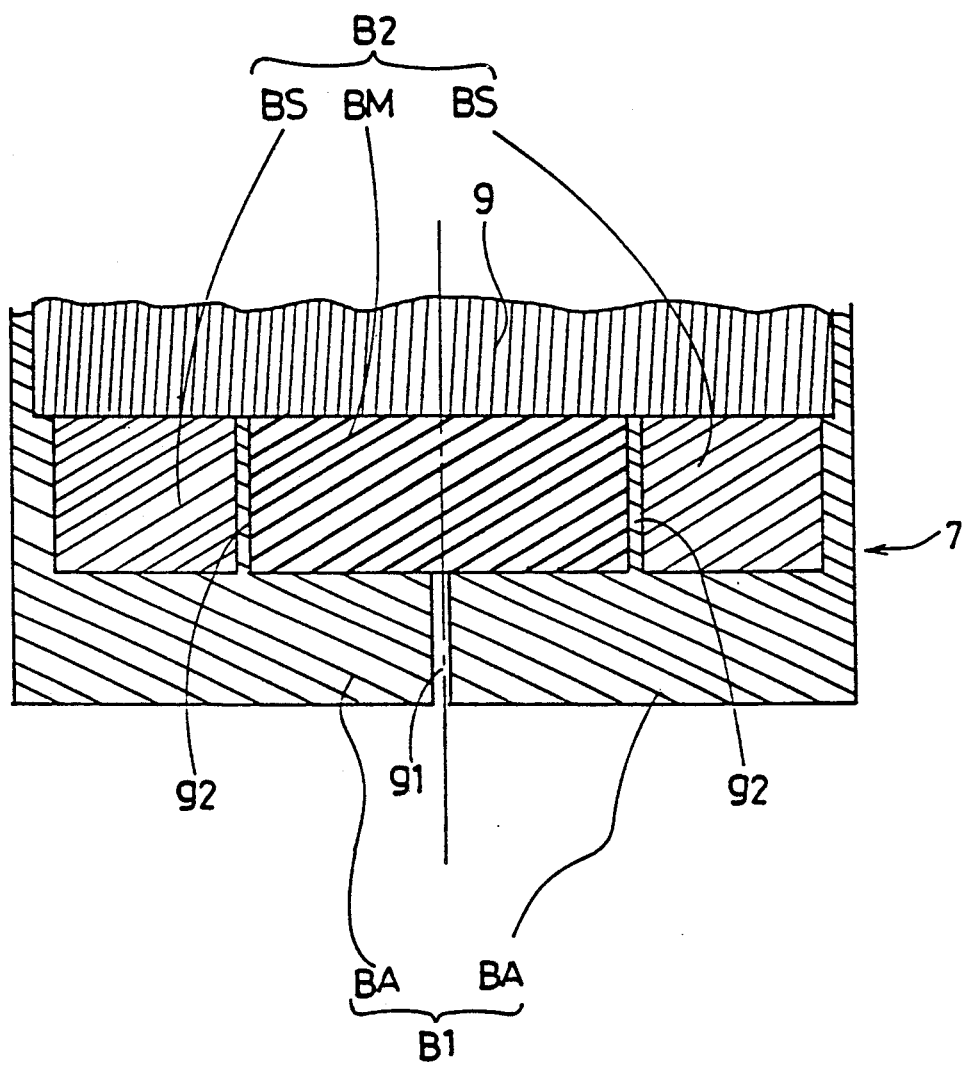
FIG. 5 is a plan development view showing the structure of its belt ply.

FIGS. 4 and 5 shows a tire 1B of the second invention. A band layer 9 is formed outside the belt layer 7 in the radial direction of the tire 1B in the figure.

The band layer 9 is formed by a spiral band ply in which band cords of organic fibers having a high extensibility such as nylon and polyester are wound in a spiral shape approximately parallel to the tire's equator C.

Two layers of an inner and outer spiral band ply are overlaid in the embodiment, which are wound mutually in reverse directions. The width BW3 of band layer 9 is wider than the width BW2 of the second belt ply B2.

Thus, by forming the width BW3 of band layer 9 wider than that of the second belt ply B2, both ends of the second belt ply B2 can be covered. As a result, separations which tend to occur in the end of the second belt ply B2 can be prevented. In addition, the band layer 9 can supplement the heterogeneity in rigidity of the divided belt layer 7. Therefore, the initial elasticities EA and EB may not be equal in the tire 1B with the band layer 9.

The band layer 9 may be formed by overlaying two or more cut band plies comprising band cords of organic fibers in the structure of the band layer 9 inclined at an angle 60 deg., preferably 40 deg. to 60 deg. or less, preferably 40 deg. or more and 50 deg., more preferably 45 deg., against the tire's equator C with both ends cut, in which the band cords are placed mutually in different directions.

Figure 6:
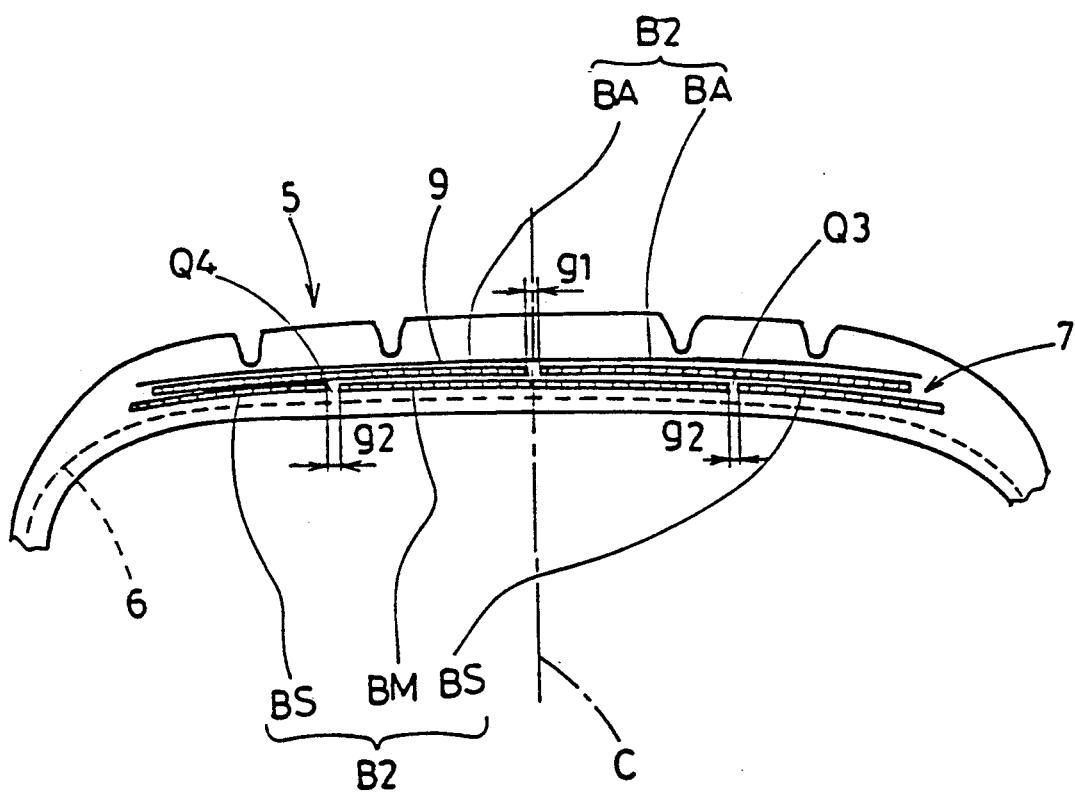
FIG. 6 is a sectional view showing another embodiment of the second invention.
Figure 7:
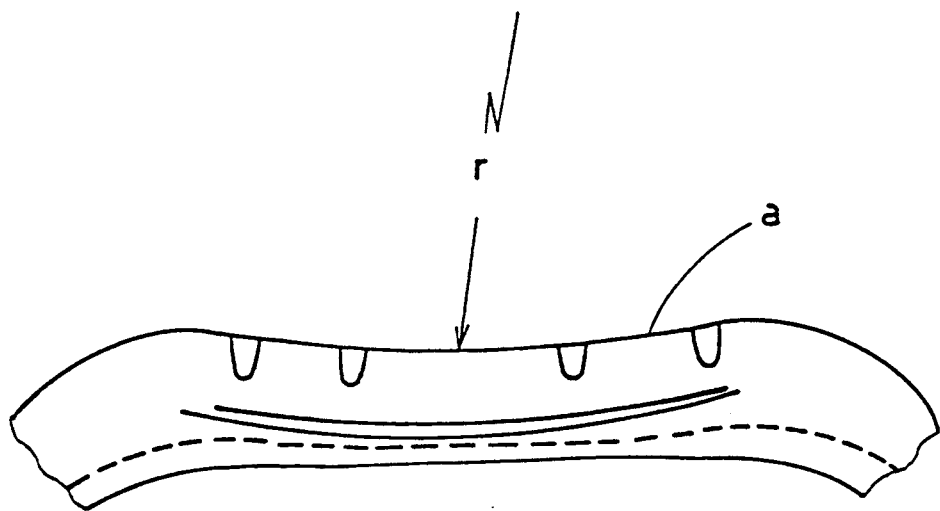
FIG. 7 is a sectional view showing the conventional technologies.

The other embodiment of the second invention is shown in FIG. 6.

The second belt ply B2 of the belt layer 7 in the embodiment comprises two belt ply parts BA1 and BA2 divided on the tire's equatorial line C reversely to the structure shown in FIG. 1, while the first belt ply B1 is composed of a middle belt ply BM and two side belt plies BS1 and BS2 by dividing it into three parts separating them by a gap $g2a$, $g2b$ at two division points Q3 and Q4 which points are 0.2 to 0.3 times the width BW2 of the second belt ply B2 from the tire's equator C on both sides in the direction of tire's axis.

EXAMPLE A

Prototypes of tire 1A of the first invention having dimensions of 255/40ZR17 were produced according to the specifications shown in Table 1 to have a structure shown in FIG. 1 or 3 and tested.

A carcass having the following specifications was used both in the embodiments and conventional tire.

| Material of carcass cord | Polyester |
|---|---|
| Thickness of cord | 1500d/2 |
| Cord ends | 49/5 cm |
| Number of carcass plies | 2 |
| Inclination of cords | 90 deg. |

The results of tests are shown in Table 2.
The tests were performed in the following manner.

1) High-Speed Durability Test

The test was performed by mounting a tire on a drum running tester of 1.6 m in diameter and having a smooth surface, applying the maximum load and maximum internal pressure specified by the JIS, and the driving distance until breakage was obtained starting from a speed of 160 km/h which was increased by 10 km/h thereafter every 2 hours of drive, which was shown by index, setting the value of a conventional tire 1 at 100 points. Higher scores show superior performance, and 120 points and higher scores were satisfactory values for the test.

the test results are found in Table 2.

2) Riding Comfort Vibration Test

The test was performed by forming an iron convex of 25 mm in height in one part on a drum surface of 1.6 m in diameter, applying the maximum load and maximum internal pressure specified in the JIS to the prototype tires, and the load varying forces in the horizontal and vertical directions of the fixing shaft to which the tire is mounted were obtained when the tire passed over the convex. The results are shown by setting the conventional tire at 100 points. Higher score of index shows smaller reaction, showing superiority in riding comfort. Scores of 101 points and higher were approved.

A speed of 60 to 120 km/h was employed for the high-speed test and a speed of 20 to 50 km/h for the low-speed test in the table.

3) Field Wear Resistance Test

The tires were mounted on an actual automobile, driven for 40,000 km on freeways and general paved road at a rate of 1:1, and driving distances until the tread part was worn to 1 mm was shown by indices setting the conventional tire at 100 points. Higher scores show better performance, and scores of 150 and higher were approved.

4) Field Deviational Wear Test

Wear rate of the shoulder part of tires which were tested in test 3) was shown by indices setting the wear rate of a crown rib part at 100 points. Scores nearer to 100 points show that the wear rates are more equivalent. Points in 100±2 were approved.

EXAMPLE B

Prototypes of tire 1B of the second invention having dimensions of 255/40ZR17 were produced in the same manner according to the specifications shown in Table 3 to have a structure shown in FIG. 4 or 6, and the high-speed durability test, riding comfort vibration test, field wear resistance test, and field deviational wear test were performed as in Example A.

EFFECTS OF THE INVENTION

Thus, the rigidity of crown part and shoulder part can be set at a good balance in a pneumatic tire of the invention, even in the case of a tire with smaller aspect ratio, and the durability can be improved not only in low-speed driving but also in high-speed driving, as one of the belt plies of the belt layer is divided into three parts and the other into two with a gap relatively formed between the parts, and the division points are different. In addition, vibration in driving is reduced to improve the riding comfort as well as improve the handling performance and steering stability.

The test results are found in Table 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Example 1 | Example 2 | Example 3 | Example 4 | Example 5 | Comparison 1 |
|---|---|---|---|---|---|---|
| Tire aspect ratio (%) (Tire maximum height (H)/tire width (W) | 50 | 50 | 50 | 50 | 50 | 50 |
| Tread width (TW) (mm) | 176 | 176 | 176 | 176 | 176 | 176 |
| Tread gauge crown part (mm) | 10.0 | 10.0 | 10.0 | 10.0 | 10.0 | 14.5 |
| shoulder part (mm) | 10.0 | 10.0 | 10.0 | 10.0 | 10.0 | 10.0 |
| composition | FIG. 1 | FIG. 1 | FIG. 3 | FIG. 1 | FIG. 1 | — |
| First belt width (BW1) (mm) | 168 | 168 | 168 | 158 | 158 | 168 |
| BW1/TW | 0.95 | 0.95 | 0.95 | 0.9 | 0.9 | 0.95 |
| Second belt width (BW2) (mm) | 162 | 162 | 162 | 154 | 154 | 162 |
| BW2/TW | 0.92 | 0.92 | 0.92 | 0.88 | 0.88 | 0.92 |
| Division point (Q1 TO Q2) (mm) | 42 | 42 | 40.5 | 39.5 | 39.5 | — |
| gap g1 (mm) | 4 | 0.5 | 4 | 4 | 0.5 | — |
| gap g2 (mm) | 4 | 0.5 | 0.5 | 0.5 | 4 | — |
| Belt cord material | steel | steel | steel | steel | steel | steel |
| Twist structure of central belt ply pieces (BM) | 1 × 5/0.25 | 1 × 4/0.22 | 2 + 7 × 0.22 + 1 | 3/0.175 + 6/0.32 | 3/0.175 + 6/0.32 | 3/0.175 + 6/0.32 |
| Twist structure of other belt ply pieces (BS,BA) | 3/0.175 + 6/0.32 | 3/0.175 + 6/0.32 | 2 × 0.175 + 6 × 0.32 | 3/0.175 + 6/0.32 | 3/0.175 + 6.032 | 3/0.175 + 6/0.32 |
| Initial elasticity of central belt ply piece (EA) (kgf/mm²) | 10,660 | 12,090 | 8,060 | 8,060 | 8,060 | 3,000 |
| Initial elasticity of other belt ply pieces (EB) (kgf/mm²) | 3,000 | 3,000 | 3,830 | 3,000 | 3,000 | 3,000 |
| EA/EB | 3.5 | 4 | 2.1 | 2.7 | 2.7 | 1 |
| Curvature radius of outer surface of tread part (mm) | 320 | 320 | 320 | 340 | 300 | 550 |

|  | Comparison 2 | Comparison 3 | Comparison 4 | Comparison 5 | Comparison 6 | Comparison 7 |
|---|---|---|---|---|---|---|
| Tire aspect ratio (%) (Tire maximum height (H)/tire width (W) | 50 | 50 | 50 | 50 | 50 | 50 |
| Tread width (TW) (mm) | 176 | 176 | 176 | 176 | 176 | 176 |
| Tread gauge Crown part (mm) | 10.0 | 10.0 | 10.0 | 10.0 | 10.0 | 10.0 |
| shoulder part (mm) | 10.0 | 10.0 | 10.0 | 10.0 | 10.0 | 10.0 |
| composition | FIG. 1 | FIG. 1 | FIG. 1 | FIG. 1 | FIG. 1 | FIG. 3 |
| First belt width (BW1) (mm) | 168 | 168 | 168 | 168 | 168 | 168 |

TABLE 1-continued

|  |  |  |  |  |  |  |
|---|---|---|---|---|---|---|
| BW1/TW | 0.95 | 0.95 | 0.95 | 0.95 | 0.95 | 0.95 |
| Second belt width (BW2) (mm) | 162 | 162 | 162 | 162 | 162 | 162 |
| BW2/TW | 0.92 | 0.92 | 0.92 | 0.92 | 0.92 | 0.92 |
| Division point (Q1 TO Q2) (mm) | 42 | 42 | 42 | 42 | 40.5 | 40.5 |
| gap g1 (mm) | 0.4 | 5 | 0.5 | 4 | 4 | 0.5 |
| gap g2 (mm) | 0.4 | 5 | 0.5 | 4 | 4 | 0.5 |
| Belt cord material | steel | steel | steel | steel | steel | steel |
| Twist structure of central belt ply pieces (BM) | 3/0.175 + 6/0.32 | 3/0.175 + 6/0.32 | 1 × 4 × 0.22 | 1 × 4 × 0.22 | 3/0.175 + 6/0.32 | 3/0.175 + 6/0.32 |
| Twist structure of other belt ply pieces (BS,BA) | 3/0.175 + 6/0.32 | 3/0.175 + 6/0.32 | 3 × 7 × 0.15 | 3 × 7 × 0.15 | 3/0.175 + 6/0.32 | 3/0.175 + 6/032 |
| Initial elasticity of central belt ply piece (EA) (kgf/mm$^2$) | 3,000 | 3,000 | 12,090 | 12,090 | 3,000 | 3,000 |
| Initial elasticity of other belt ply pieces (EB) (kgf/mm$^2$) | 3,000 | 3,000 | 2,550 | 2,550 | 3,000 | 3,000 |
| EA/EB | 1 | 1 | 4.7 | 4.7 | 1 | 1 |
| Curvature radius of outer surface of tread part (mm) | 400 | 280 | 320 | 320 | 320 | 360 |

TABLE 2

|  | Criterion | Example 1 | Example 2 | Example 3 | Example 4 | Example 5 | Comparison 1 | Comparison 2 | Comparison 3 | Comparison 4 | Comparison 5 | Comparison 6 | Comparison 7 |
|---|---|---|---|---|---|---|---|---|---|---|---|---|---|
| High speed durability (index) |  | 120 or more | 130 | 130 | 130 | 125 | 135 | 100 | 108 | 138 | 130 | 130 | 130 | 122 |
| Riding comfort vibration test |  |  |  |  |  |  |  |  |  |  |  |  |  |  |
| Reaction in vertical direction when riding over convex (index) | High speed | 101 or more | 102 | 102 | 102 | 101 | 102 | 100 | 100 | 104 | 102 | 102 | 102 | 101 |
|  | Low speed | 101 or more | 102 | 102 | 102 | 102 | 102 | 100 | 100 | 103 | 102 | 102 | 102 | 102 |
| Reaction in longitudinal direction when riding over cinvex (index) | High speed | 101 or more | 102 | 102 | 102 | 101 | 101 | 100 | 100 | 102 | 102 | 102 | 102 | 101 |
|  | Low speed | 101 or more | 104 | 105 | 105 | 103 | 102 | 100 | 100 | 110 | 102 | 102 | 105 | 103 |
| Cornering power (kg/deg) (index) |  | 110 or more | 115 | 120 | 110 | 110 | 110 | 100 | 100 | 90 | 120 | 120 | 100 | 105 |
| Field wear resistance (index) |  | 110 or more | 115 | 120 | 110 | 115 | 112 | 100 | 100 | 80 | 120 | 110 | 100 | 100 |
| Field deviational wear resistance (index) |  | 100 ± 2 | 100 | 100 | 100 | 100 | 100 | 100 | 100 | 90 | 95 | 90 | 100 | 100 |

TABLE 3

|  | Example 1 | Example 2 | Example 3 | Example 4 | Example 5 | Example 6 | Example 7 |
|---|---|---|---|---|---|---|---|
| Tire aspect ratio (%) (Tire maximum height (H)/tire width (W)) | 50 | 50 | 50 | 50 | 50 | 50 | 50 |
| Tread width (TW) (mm) | 176 | 176 | 176 | 176 | 176 | 176 | 176 |
| Tread gauge crown part (mm) | 10.0 | 10.0 | 10.0 | 10.0 | 10.0 | 10.0 | 10.0 |
| shoulder (mm) | 10.0 | 10.0 | 10.0 | 10.0 | 10.0 | 10.0 | 10.0 |
| composition | FIG. 1 | FIG. 3 | FIG. 1 | FIG. 1 | FIG. 1 | FIG. 1 | FIG. 3 |
| First belt width (BW) (mm) | 168 | 168 | 158 | 158 | 168 | 168 | 168 |
| BW1/TW | 0.95 | 0.95 | 0.9 | 0.9 | 0.95 | 0.95 | 0.95 |
| Second belt width (BW2) (mm) | 162 | 162 | 154 | 154 | 162 | 162 | 162 |

TABLE 3-continued

|  |  |  |  |  |  |  |  |
|---|---|---|---|---|---|---|---|
| BW2/TW | 0.92 | 0.92 | 0.88 | 0.88 | 0.92 | 0.92 | 0.92 |
| Division point (Q1 to Q5) (mm) | 42 | 40.5 | 39.5 | 39.5 | 42 | 42 | 40.5 |
| gap g1 (mm) | 4 | 0.4 | 0.5 | 4 | 4 | 0.5 | 4 |
| gap g2 (mm) | 4 | 0.4 | 0.5 | 4 | 4 | 0.5 | 0.5 |
| Belt cord material | steel | steel | steel | steel | steel | steel | steel |
| Twist structure of central belt ply pieces (BM) | 3/0.175 + 6/0.32 | 3/0.175 + 6/0.32 | 3/0.175 + 6/0.32 | 3/0.175 + 6/0.32 | 1 × 5/0.25 | 1 × 4/0.22 | 2 + 7 × 0.22 + 1 |
| Twist structure of other belt ply pieces (BS,BA) |  |  |  |  | 3/0.175 + 6/0.32 | 3/0.175 + 6/0.32 | 2 × 0.175 + 6 × 0.32 |
| Initial elasticity of central belt ply piece (EA) (kgf/mm$^2$) | 3,000 | 3,000 | 3,000 | 3,000 | 10,660 | 12,090 | 8,060 |
| Initial elasticity of other belt ply pieces (EB) (kgf/mm$^2$) |  |  |  |  | 3,000 | 3,000 | 3,830 |
| EA/EB | 1 | 1 | 1 | 1 | 3.5 | 4 | 2.1 |
| Number of band layers | 2 | 2 | 1 | 2 | 2 | 1 | 2 |
| Curvature radius of outer surface of tread part (mm) | 320 | 330 | 320 | 320 | 320 | 320 | 320 |

|  | Example 8 | Comparison 1 | Comparison 2 | Comparison 3 | Comparison 4 | Comparison 5 |
|---|---|---|---|---|---|---|
| Tire aspect ratio (%) (Tire maximum height (H)/tire width (W) | 50 | 50 | 50 | 50 | 50 | 50 |
| Tread width (TW) (mm) | 176 | 176 | 176 | 176 | 176 | 176 |
| Tread crown part (mm) | 10.0 | 14.5 | 10.0 | 10.0 | 10.0 | 10.0 |
| gauge shoulder (mm) | 10.0 | 10.0 | 10.0 | 10.0 | 10.0 | 10.0 |
| composition | FIG. 1 | — | FIG. 1 | FIG. 1 | FIG. 3 | FIG. 3 |
| First belt width (BW) (mm) | 158 | 168 | 168 | 168 | 168 | 168 |
| BW1/TW | 0.9 | 0.95 | 0.95 | 0.95 | 0.95 | 0.95 |
| Second belt width (BW2) (mm) | 154 | 162 | 162 | 162 | 162 | 162 |
| BW2/TW | 0.88 | 0.92 | 0.92 | 0.92 | 0.92 | 0.92 |
| Division point (Q1 to Q5) (mm) | 39.5 | — | 42 | 42 | 40.5 | 40.5 |
| gap g1 (mm) | 0.5 | — | 0.4 | 0.4 | 5 | 5 |
| gap g2 (mm) | 4 | — | 0.4 | 0.4 | 5 | 5 |
| Belt cord material | steel | steel | steel | steel | steel | steel |
| Twist structure of central belt ply pieces (BM) | 3/0.175 + 6/0.32 | 3/0.175 + 6/0.32 | 3/0.175 + 6/0.32 | 3/0.175 + 6/0.32 | 3/0.175 + 6/0.32 | 3/0.175 + 6/0.32 |
| Twist structure of other belt ply pieces (BS, BA) | 3/0.175 + 6/0.32 |  |  |  |  |  |
| Initial elasticity of central belt ply piece (EA) (kgf/mm$^2$) | 8,060 | 3,000 | 3,000 | 3,000 | 3,000 | 3,000 |
| Initial elasticity of other belt ply pieces (EB) (kgf/mm$^2$) | 3,000 |  |  |  |  |  |
| EA/EB | 2.7 | 1 | 1 | 1 | 1 | 1 |
| Number of band layers | 2 | — | — | 2 | — | — |
| Curvature radius of outer surface of tread part (mm) | 300 | 550 | 400 | 400 | 280 | 280 |

TABLE 4

|  | Criterion | Example 1 | Example 2 | Example 3 | Example 4 | Example 5 | Example 6 | Example 7 | Example 8 | Comparison 1 | Comparison 2 | Comparison 3 | Comparison 4 | Comparison 5 |
|---|---|---|---|---|---|---|---|---|---|---|---|---|---|---|
| High speed durability (index) | 120 or more | 138 | 130 | 125 | 135 | 138 | 135 | 125 | 135 | 100 | 105 | 108 | 138 | 140 |
| Riding comfort vibration test |  |  |  |  |  |  |  |  |  |  |  |  |  |  |
| Reaction in vertical direction when riding over convex (index) — High speed | 101 or more | 102 | 102 | 102 | 102 | 102 | 102 | 101 | 102 | 100 | 102 | 100 | 104 | 104 |
| Reaction in vertical direction when riding over convex (index) — Low speed | 101 or more | 102 | 102 | 102 | 103 | 102 | 102 | 102 | 102 | 100 | 102 | 102 | 105 | 105 |
| Reaction in longitudinal direction when riding over convex (index) — High speed | 101 or more | 102 | 102 | 102 | 102 | 102 | 102 | 101 | 101 | 100 | 102 | 102 | 103 | 103 |
| Reaction in longitudinal direction when riding over convex (index) — Low speed | 101 or more | 105 | 102 | 105 | 104 | 104 | 105 | 103 | 102 | 100 | 102 | 102 | 103 | 103 |
| Cornering power kg/deg (index) | 105 or more | 106 | 105 | 108 | 107 | 117 | 122 | 110 | 110 | 100 | 100 | 105 | 90 | 93 |
| Field wear resistance (index) | 105 or more | 108 | 105 | 106 | 106 | 116 | 122 | 115 | 112 | 100 | 102 | 102 | 90 | 95 |
| Field deviational wear | 100 + 2 | 100 | 100 | 100 | 100 | 100 | 100 | 100 | 100 | 100 | 100 | 100 | 90 | 95 |

TABLE 4-continued

| Criterion | Example 1 | Example 2 | Example 3 | Example 4 | Example 5 | Example 6 | Example 7 | Example 8 | Comparison 1 | Comparison 2 | Comparison 3 | Comparison 4 | Comparison 5 |
|---|---|---|---|---|---|---|---|---|---|---|---|---|---|
| resistance (index) | | | | | | | | | | | | | |

I claim:

1. A pneumatic tire comprising
a carcass extending from a tread part through a sidewall part and wrapped around a bead core in each of two bead parts, and
a belt layer placed radially outside the carcass in the tread part, wherein:
said belt layer includes a first belt ply B1 and a second belt ply B2 that are formed in sequence from the carcass side;
the width BW1 of the first belt ply in the axial direction of the tire is in a range from greater than 0.9 to less than 0.95 times the tread width TW, wherein tread width TW is the length between outer edges of the tread in the axial direction of the tire;
the width BW2 of the second belt ply B2 in the axial direction of the tire is in a range from greater than 0.88 to less than 0.92 times the tread width TW;
one of the belt plies, the first belt ply B1 or second belt ply B2, is divided into and composed of two belt ply parts BA1 and BA2 which are separated by a gap g1 on the tire's equator C; and
the other belt ply is divided into and composed of a middle belt ply part BM and two side-belt ply parts BS1 and BS2 which are separated by a pair of gaps g2a and g2b, respectively located at two division points a distance of 0.2 to 0.3 times the width of the one of belt plies B1 or B2 from the tire's equator C on both respective sides in the axial direction of the tire.

2. The pneumatic tire according to claim 1, wherein the initial elasticity EA of belt cords of the middle belt ply part BM is greater than the initial elasticity EB of belt cords of the other belt ply parts BA1, BA2, BS1, and BS2.

3. The pneumatic tire according to claim 1, wherein the ratio EA/EB of initial elasticity EA of belt cords of the middle belt ply part BM to the initial elasticity EB of belt cords of the other belt ply parts BS1, BS2, BA1, and BA2 is in a range from 2.0 to 4.0.

4. The pneumatic tire according to claim 1, 2 or 3, wherein each of the gaps g1 and g2a, g2b are in a range from 0.5 mm to 4 mm.

5. A pneumatic tire comprising
a carcass extending from a tread part through a sidewall part and wrapped around a bead core in a each of two bead parts;
a belt layer placed radially outside the carcass in the tread part; and
a band layer, the band layer having band cords of organic fibers and being disposed outside in radial direction of the belt layer, wherein
said belt layer includes a first belt ply B1 and a second belt ply B2 that are formed in sequence from the carcass side;
the width BW1 of the first belt ply in the axial direction of the tire is in a range from greater than 0.9 to less than 0.95 times the tread width TW wherein tread width TW is the length between outer edges of the tread in the axial direction of the tire;
the width BW2 of the second belt ply B2 in the axial direction of the tire is in a range from greater than 0.88 to less than 0.92 times the tread width TW;
one of the belt plies, the first belt ply B1 or second belt ply B2, is divided into and composed of two belt ply parts BA1 and BA2 which are separated by a gap g1 on the tire's equator C; and
the other belt ply is divided into and composed of a middle belt ply part BM and two side-belt ply parts BS1 and BS2 which are separated by a pair of gaps g2a and g2b, respectively, located at two division points each spaced a distance of 0.2 to 0.3 times the width of the one of belt plies B1 or B2 from the tire's equator C on both respective sides in the axial direction of the tire.

6. The pneumatic tire according to claim 5, wherein the initial elasticity EA of belt cords of the middle belt ply part BM is equal to or greater than the initial elasticity EB of belt cords of the other belt plies BA1, BA2, BS1 and BS2.

7. The pneumatic tire according to claim 5, wherein the ratio EA/EB of initial elasticity EA of belt cords of the middle belt ply part BM to the initial elasticity EB of belt cords of the other belt plies BS1, BS2, BA1 and BA2 is in a range from 2.0 to 4.0.

8. The pneumatic tire according to claim 5, 6 or 7, wherein each of the gaps g1 and g2a, g2b is in a range from 0.5 mm to 4 mm.

9. The pneumatic tire according to claim 5, wherein the band layer comprises at least one layer of spiral band ply formed by winding band cords spirally.

10. The pneumatic tire according to claim 6, wherein the band layer comprises at least one layer of spiral band ply formed by winding band cords spirally.

11. The pneumatic tire according to claim 7, wherein the band layer comprises at least one layer of spiral band ply formed by winding band cords spirally.

12. The pneumatic tire according to claim 8, wherein the band layer comprises at least one layer of spiral band ply formed by winding band cords spirally.

13. The pneumatic tire according to claim 5, wherein the band layer comprises two or more cut end plies of band cords inclined at an angle in the range from 30 degrees to 60 degrees against tire equator C with both ends cut.

14. The pneumatic tire according to claim 6, wherein the band layer comprises two or more cut end plies of band cords inclined at an angle of 30 degrees or more and 60 degrees or less against tire equator C with both ends cut.

15. The pneumatic tire according to claim 7, wherein the band layer comprises two or more cut end plies of band cords inclined at an angle of 30 degrees or more and 60 degrees or less against tire equator C with both ends cut.

16. The pneumatic tire according to claim 8, wherein the band layer comprises two or more cut end plies of band cords inclined at an angle of 30 degrees or more and 60 degrees or less against tire equator C with both ends cut.

* * * * *